(12) United States Patent
Georgis et al.

(10) Patent No.: US 8,959,145 B2
(45) Date of Patent: *Feb. 17, 2015

(54) SYSTEM AND METHOD FOR PRELOADING CONTENT SEGMENTS TO CLIENT DEVICES IN AN ELECTRONIC NETWORK

(71) Applicants: Sony Corporation, Tokyo (JP); Sony Electronics Inc., Park Ridge, NJ (US)

(72) Inventors: Nikolaos Georgis, San Diego, CA (US); Djung Nguyen, San Diego, CA (US); Paul Hwang, Burbank, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/160,615

(22) Filed: Jan. 22, 2014

(65) Prior Publication Data

US 2014/0195642 A1    Jul. 10, 2014

Related U.S. Application Data

(63) Continuation of application No. 11/711,259, filed on Feb. 27, 2007, now Pat. No. 8,676,882.

(51) Int. Cl.
| | | |
|---|---|---|
| *G06F 15/16* | (2006.01) | |
| *H04B 1/034* | (2006.01) | |
| *H04N 7/173* | (2011.01) | |
| *H04L 29/08* | (2006.01) | |
| *H04N 21/433* | (2011.01) | |
| *H04N 21/462* | (2011.01) | |
| *H04N 21/472* | (2011.01) | |
| *H04N 21/4788* | (2011.01) | |
| *H04N 21/63* | (2011.01) | |
| *H04N 21/845* | (2011.01) | |

(52) U.S. Cl.
CPC ........ *H04L 67/1061* (2013.01); *H04N 7/17309* (2013.01); *H04N 21/4334* (2013.01); *H04N 21/4622* (2013.01); *H04N 21/472* (2013.01); *H04N 21/4788* (2013.01); *H04N 21/632* (2013.01); *H04N 21/8456* (2013.01); *H04L 67/104* (2013.01)
USPC ........ 709/203; 455/221.1; 455/100; 725/100; 725/101

(58) Field of Classification Search
USPC .................................. 709/203; 725/100, 101
See application file for complete search history.

(56) References Cited

FOREIGN PATENT DOCUMENTS

CN        1476197 A        2/2004

*Primary Examiner* — Asghar Bilgrami
(74) *Attorney, Agent, or Firm* — Gregory J. Koerner; Redwood Patent Law (57) ABSTRACT

A system and method for supporting content distribution in an electronic network includes a peer-to-peer network of electronic devices. The electronic devices are initially preloaded in a distributed manner with various content segments from corresponding content items. When a system user selects a particular content item on a corresponding electronic device, a download manager of the electronic device may automatically generate content segment requests to other appropriate electronic devices in the peer-to-peer network. The download manager may then download and automatically reassemble the content segments to produce the selected content item for utilization by the system user.

20 Claims, 9 Drawing Sheets

SYSTEM AND METHOD FOR PRELOADING CONTENT SEGMENTS TO CLIENT DEVICES IN AN ELECTRONIC NETWORK

CROSS-REFERENCE TO RELATED APPLICATIONS

This Application is related as a Continuation Application to U.S. patent application Ser. No. 11/711,259 entitled "System And Method For Preloading Content Segments To Client Devices In An Electronic Network," that was filed on Feb. 27, 2007. The foregoing related Application is commonly owned, and is hereby incorporated by reference.

BACKGROUND SECTION

1. Field of the Invention

This invention relates generally to techniques for managing electronic information, and relates more particularly to a system and method for preloading content segments to client devices in an electronic network.

2. Description of the Background Art

Implementing effective methods for managing electronic information is a significant consideration for designers and manufacturers of contemporary electronic devices. However, effectively managing information utilized by devices in an electronic network may create substantial challenges for system designers. For example, enhanced demands for increased device functionality and performance may require more system processing power and require additional software resources. An increase in processing or software requirements may also result in a corresponding detrimental economic impact due to increased production costs and operational inefficiencies.

Furthermore, enhanced device capability to perform various advanced data management operations may provide additional benefits to a system user, but may also place increased demands on the control and management of various system components. For example, an enhanced electronic network device that effectively manages electronic content information may benefit from an effective implementation because of the large amount and complexity of the digital data involved.

Due to growing demands on system resources and substantially increasing data magnitudes, it is apparent that developing new techniques for managing information in electronic networks is a matter of concern for related electronic technologies. Therefore, for all the foregoing reasons, developing effective techniques for managing information in electronic networks remains a significant consideration for designers, manufacturers, and users of contemporary electronic devices.

SUMMARY

In accordance with the present invention, a system and method for supporting content distribution in an electronic network are disclosed. In one embodiment, a segmented content preloading procedure is initiated by defining a set of subject content items. The content items may be any desired types of electronic content. For example, the content items may include, but are not limited to, motion pictures or other types of electronic entertainment programs. In certain embodiments, a system designer or other appropriate entity may initially define a total number of content items for preloading onto respective client devices. The system designer may then select the specific titles of the content items for preloading onto the client devices.

The system designer may also define the number of content segments into which each content item will be subdivided. In certain embodiments, each content item need not be subdivided into the same number of content segments. The system designer next defines, for each content item, the relative size of the respective content segments. In certain embodiments, each content segment may have a different size. However, combining the content segments for a given content item preferably results in the entire content item.

The system designer may then map the various content segments to corresponding subsets of the client devices. In certain embodiments, one-to-many mapping is allowed in which a single content segment is provided to multiple client devices. In addition, it is not always mandatory that all client devices be preloaded with content segments. However, each of the individual content segments is preferably mapped to at least one client device. The system designer, a device manufacturer, or other appropriate entity may then preload the mapped content segments onto the appropriate corresponding client devices.

After the preloaded client devices are deployed in a peer-to-peer network, various content reassembly procedures may be performed to provide selected content items to system users of the client devices. In a content reassembly procedure, a system user typically utilizes an electronic device from the peer-to-peer network to select an available content item from an extensive content catalogue of supported content items. A download manager of the electronic device responsively sends a segment location request to a tracking server or other tracking entity by utilizing any effective techniques. For example, in certain embodiments, the electronic device may access the tracking server through the Internet or other distributed computer network.

A tracker module of the tracking server then sends appropriate segment locations to the download manager of the electronic device to specifically identify current locations of required content segments for reassembling the selected content item. The download manager of the electronic device next sends individual content segment requests to the various target client devices that were identified by the tracking server as currently storing the missing content segments for reassembling the selected content item.

The download manager of the requesting electronic device may then receive the requested content segments from the target client devices through the peer-to-peer network. Finally, the download manager may advantageously reassemble the received content segments to produce the entire selected content item for utilization by the system user. For at least the foregoing reasons, the present invention therefore provides an improved system and method for preloading content segments to client devices in an electronic network.

DETAILED DESCRIPTION

The present invention relates to an improvement in electronic information management techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Therefore, the present invention is not intended to be limited to the embodiments shown, but is to be accorded the widest scope consistent with the principles and features described herein.

The present invention comprises a system and method for supporting content distribution in an electronic network, and includes a peer-to-peer network of electronic devices. The electronic devices are initially preloaded in a distributed manner with various content segments from corresponding content items. When a system user selects a particular content item on a corresponding electronic device, a download manager of the electronic device may automatically generate content segment requests to other appropriate electronic devices in the peer-to-peer network. The download manager may then download and automatically reassemble the content segments to produce the selected content item for utilization by the system user.

Figure 1A:
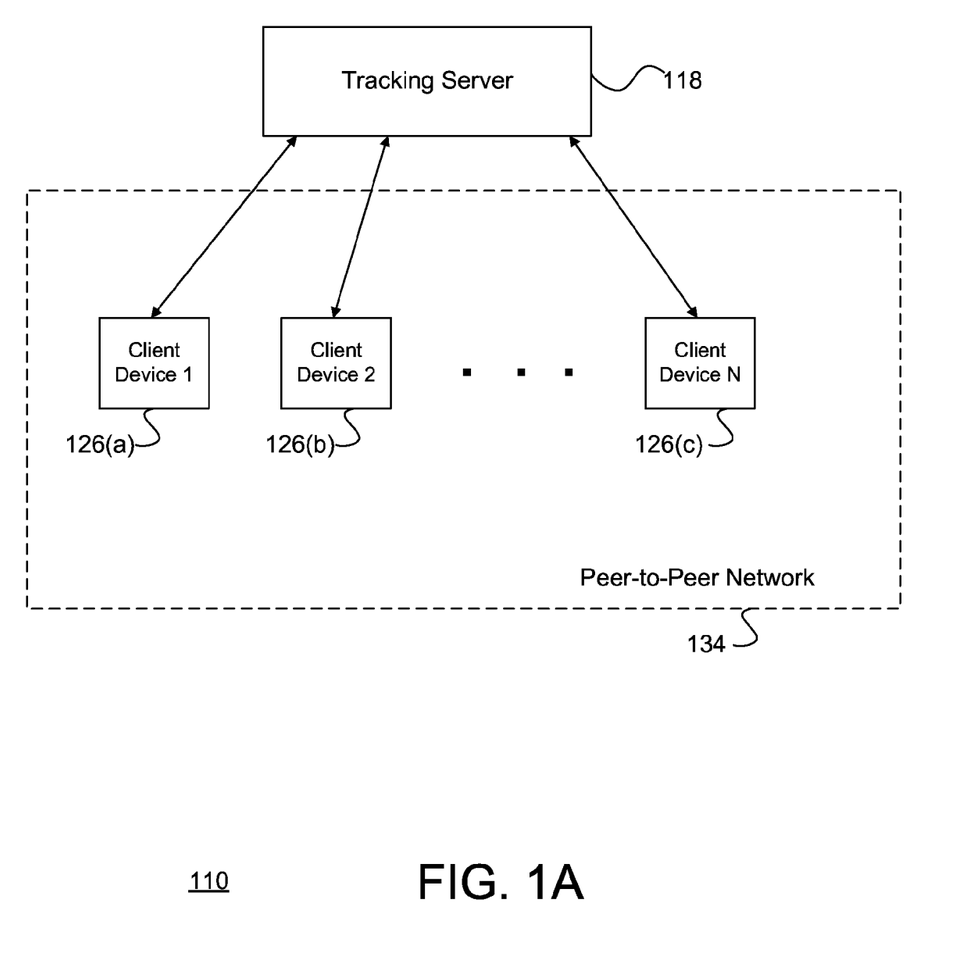
FIG. 1A is a block diagram of an electronic network, in accordance with one embodiment of the present invention.

Referring now to FIG. 1A, a block diagram of an electronic network 110 is shown, in accordance with one embodiment of the present invention. In the FIG. 1A embodiment, electronic network 110 may include, but is not limited to, a tracking server 118, and a plurality of client devices 126. In alternate embodiments, electronic network 110 may be implemented by utilizing components and configurations in addition to, or instead of, certain of those components and configurations discussed in conjunction with the FIG. 1A embodiment.

In accordance with the present invention, any desired number of client devices 126 may be configured in a peer-to-peer network 134 that is further discussed below in conjunction with FIG. 1B. In the FIG. 1A embodiment, client devices 126 may include an electronic device 1 (126(*a*)) through an electronic device N 126(*c*). In the FIG. 1A embodiment, each of the client devices 126 may bi-directionally communicate directly with other ones of the client devices 126 by utilizing any appropriate peer-to-peer communication techniques or other effective communication methods.

In accordance with the present invention, some or all of the client devices 126 may be advantageously preloaded with content segments of various pre-determined content items. The content items may include any desired types of electronic information. For example, content items may include, but are not limited to, entertainment programming, movies, video data, audio data, digital photographs, still image data, graphics, web pages, program guide information, and various types of software programs, etc.

System users may thus perform appropriate content reassembly procedures through peer-to-peer network 134 to reassemble and utilize desired content items. In the FIG. 1A embodiment, tracking server 118 may be implemented in any effective manner to track the current locations of the various content segments. One implementation for tracking server 118 is further discussed below in conjunction with FIGS. 2-3. Additional details regarding content preloading procedures and content reassembly procedures are further discussed below in conjunction with FIGS. 4 and 7-8.

Figure 1B:
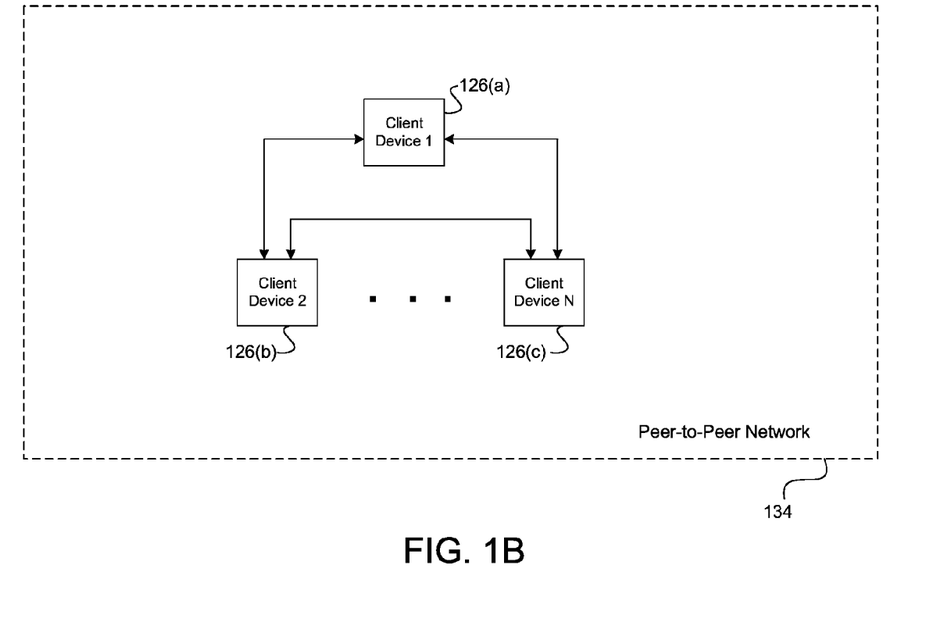
FIG. 1B is a block diagram of the peer-to-peer network of FIG. 1A, in accordance with one embodiment of the present invention.

Referring now to FIG. 1B, a block diagram of the FIG. 1A peer-to-peer network 134 is shown, in accordance with one embodiment of the present invention. The FIG. 1B embodiment includes a client device 1 (126(*a*)), a client device 2 (126(*b*)), through a client device N (126(*a*)). In alternate embodiments, peer-to-peer network 134 may be implemented by utilizing components and configurations in addition to, or instead of, certain of those components and configurations discussed in conjunction with the FIG. 1B embodiment. Furthermore, peer-to-peer network 134 may be implemented to include any desired number of client devices 126.

In the FIG. 1B embodiment, each of the client devices 126 may bi-directionally communicate directly with any other of the client devices 126 by utilizing any desired peer-to-peer communication techniques or other effective communication methods. For example, client device 1 (126(*a*)) may bi-directionally communicate directly with either client device 2 (126(*b*)) or client device N (126(*c*)). Similarly, client device 2 (126(*b*)) may bi-directionally communicate directly with client device N (126(*c*)). Furthermore, in the FIG. 1B embodiment, any of the client devices 126 in peer-to-peer network 134 may perform a peer-to-peer content transfer procedure to transfer content segments to any of the other client devices 126 in peer-to-peer network 134. Additional details regarding the utilization of the FIG. 1B peer-to-peer network 134 are further discussed below in conjunction with FIGS. 4 and 7-8.

Figure 2:
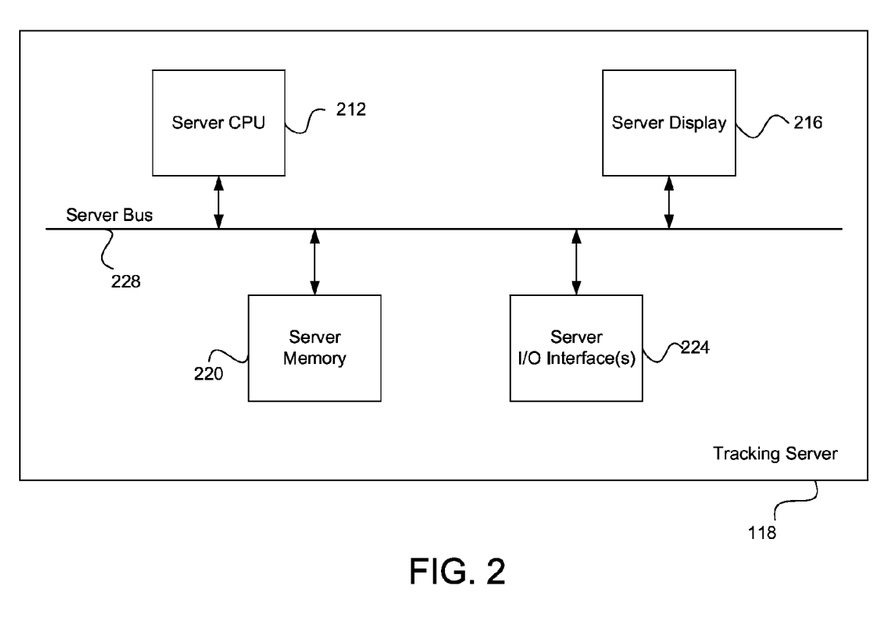
FIG. 2 is a block diagram for one embodiment of the tracking server of FIG. 1, in accordance with the present invention.

Referring now to FIG. 2, a block diagram for one embodiment of the FIG. 1A tracking server 118 is shown, in accordance with the present invention. In the FIG. 2 embodiment, tracking server 118 includes, but is not limited to, a server central processing unit (server CPU) 212, a server display 216, a server memory 220, and one or more server input/output interface(s) (server I/O interface(s)) 224. The foregoing components of tracking server 118 may be coupled to, and communicate through, a server bus 228. In alternate embodiments, tracking server 118 may alternately be implemented using components and configurations in addition to, or instead of, certain of those components and configurations discussed in conjunction with the FIG. 2 embodiment.

In the FIG. 2 embodiment, server CPU 212 may be implemented to include any appropriate and compatible microprocessor device that preferably executes software instructions to thereby control and manage the operation of tracking server 118. The FIG. 2 server display 216 may include any effective type of display technology including a cathode-ray-tube monitor or a liquid-crystal display device with an appropriate screen for displaying various information to a server user. In the FIG. 2 embodiment, server memory 220 may be implemented to include any combination of desired storage devices, including, but not limited to, read-only memory (ROM), random-access memory (RAM), and various types of non-volatile memory, such as floppy disks, memory sticks, compact disks, or hard disks. The contents and functionality of server memory 220 are further discussed below in conjunction with FIG. 3.

In the FIG. 2 embodiment, server I/O interface(s) 224 may include one or more input and/or output interfaces to receive and/or transmit any required types of information by tracking server 118. Server I/O interface(s) 224 may include one or more means for allowing a server user to communicate with tracking server 118. The utilization of tracking server 118 is further discussed below in conjunction with FIGS. 4 and 7-8.

Figure 3:
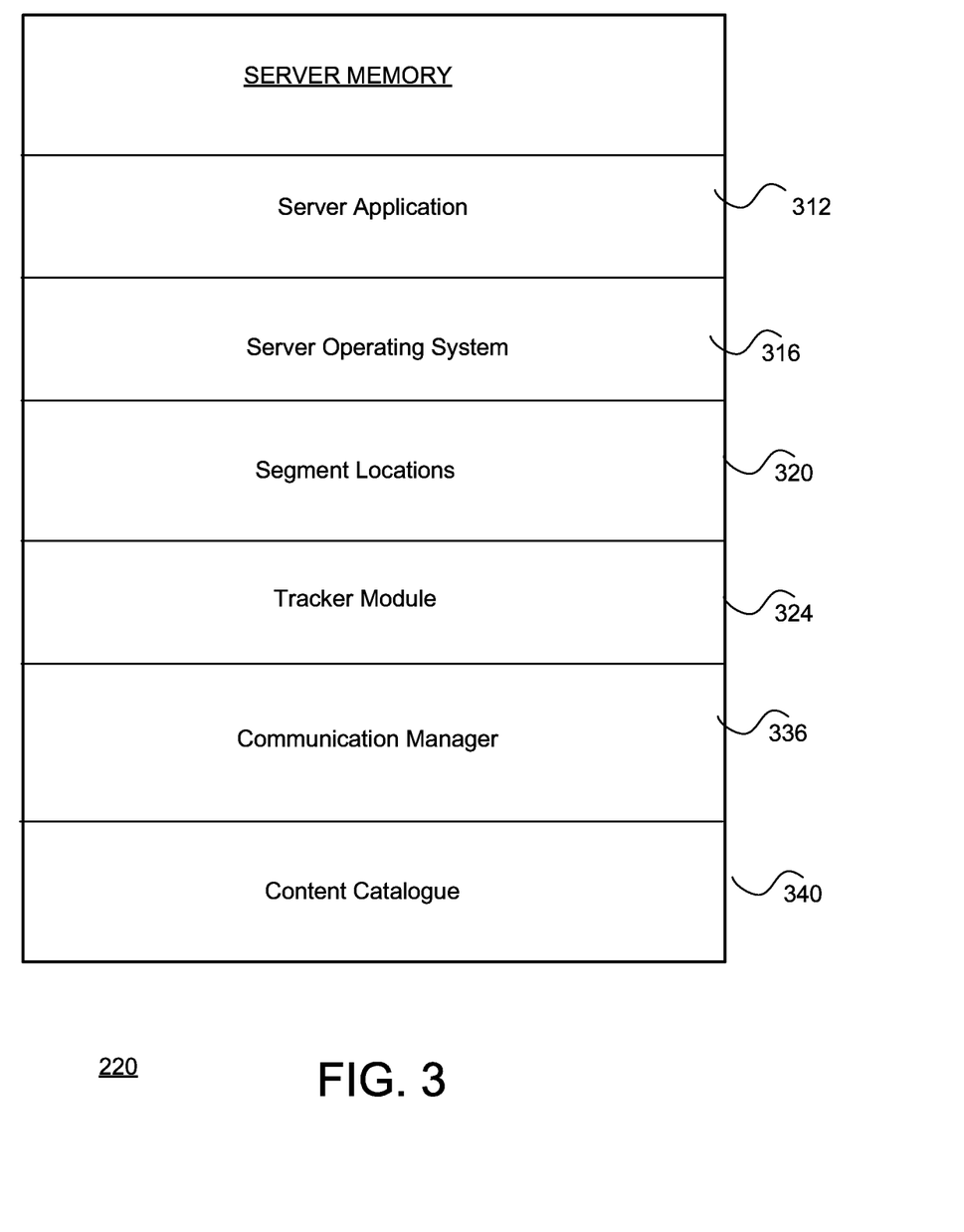
FIG. 3 is a block diagram for one embodiment of the server memory of FIG. 2, in accordance with the present invention.

Referring now to FIG. 3, a block diagram for one embodiment of the FIG. 2 server memory 220 is shown, in accordance with the present invention. In the FIG. 3 embodiment, server memory 220 may include, but is not limited to, a server application 312, a server operating system 316, a segment locations 320, a tracker module 324, a communication manager 336, and a content catalogue 340. In alternate embodiments, server memory 220 may include various other components and functionalities in addition to, or instead of, certain those components and functionalities discussed in conjunction with the FIG. 3 embodiment.

In the FIG. 3 embodiment, server application 312 may include program instructions that are preferably executed by server CPU 212 (FIG. 2) to perform various functions and operations for tracking server 118. The particular nature and functionality of server application 312 typically varies depending upon factors such as the specific type and particular functionality of the corresponding tracking server 118. Server operating system 316 may perform various low-level functions for tracking server 118.

In the FIG. 3 embodiment, segment locations 320 may include any appropriate type of tracking information to specify or track the current locations of individual content segments that are subsets of corresponding whole content items. For example, a given content item (such as a movie) may be subdivided into a specified number of corresponding content segments. These content segments may then be individually preloaded onto different ones of the client devices 126 (FIG. 1A). Segment locations 320 may include, but is not limited to, the original factory preload locations of the various content segments. In certain embodiments, segment locations 320 may include unique content segment identifiers that are associated with corresponding client device identifiers that represent the respective client devices 126 on which the content segments are stored.

In the FIG. 3 embodiment, tracker module 324 may monitor any transfers of content items between the various client devices 126. Tracker module 324 may then dynamically update segment locations 320 to incorporate any new changes in the current storage locations of the various content segments on client devices 126. In the FIG. 3 embodiment, communication manager 336 may perform appropriate communication functions with client devices 126 to transfer requested segment locations 320 and other desired information. In the FIG. 3 embodiment, content catalogue 340 may include a list of all supported content items for which content segments have been preloaded onto client devices 126. Additional details regarding the operation and implementation of tracking server 118 are further discussed below in conjunction with FIGS. 4 and 7-8.

Figure 4:
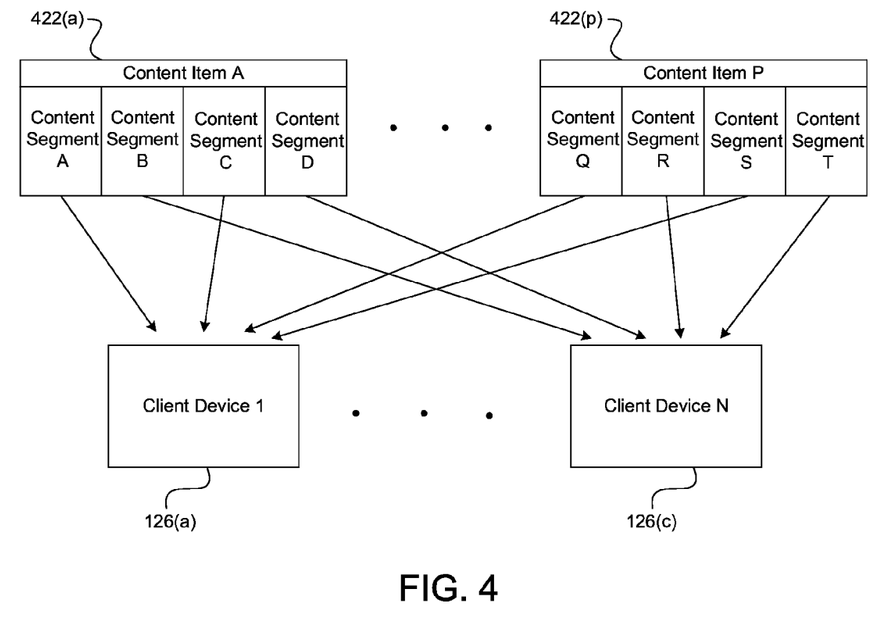
FIG. 4 is a diagram illustrating a segmented content preloading procedure, in accordance with one embodiment of the present invention.

Referring now to FIG. 4, a diagram illustrating a segmented content preloading procedure is shown, in accordance with one embodiment of the present invention. The FIG. 4 example is presented for purposes of illustration, and in alternate embodiments, the present invention may perform segmented content preloading procedures by utilizing techniques and configurations in addition to, or instead of, certain of those techniques and configurations discussed in conjunction with the FIG. 4 embodiment.

In certain situations, manufacturers of various electronic devices may desire to preload content items 422 onto their electronic devices, and offer some of these content items without cost, so that the system users may be more likely to begin using their services. One limitation of pre-loading entire content items is the physical size of device hard disks, as well as the manufacturing time needed to image the hard disk in the factory. For example, if a manufacturer wishes to preload two high-definition movies onto an electronic device, then the required size of the hard disk to store the movies might be over 200 Gigabytes, and imaging the hard disks would be very time-consuming.

Another problem is that the manufacturer must very carefully choose which content items to pre-load. Because of the large amount of digital data involved, the limited number of content items would likely not satisfy all customers, but might be attractive only to a limited subset of system users. In addition, there are various significant security issues with pre-loaded content items, because customers may be able to extract the content items without any authorization. In certain environments, manufacturers may offer their content items by means of downloading. However, this downloading option is very expensive because of the high download fees charged by content providers.

In accordance with the FIG. 4 embodiment, instead of preloading entire content items, the present invention proposes that content items 422 be divided into any desired number of different content segments of any appropriate segment size(s). In the FIG. 4 embodiment, for purposes of illustration, the shown content items 422 are both divided into four content segments. Any desired number of different content items 422 may be utilized. In the FIG. 4 example, content item A 422(*a*) is divided into four content segments A through D, and content item P 422(*p*) is divided into four content segments Q through T. However, the number of different content segments and their corresponding segment sizes is not fixed. Also, all content items 422 need not have the same number or size of content segments. The number and size of content segments per content item 422 may be determined in any effective and optimal manner.

Segmented content preloading procedures may then performed by optimally selecting and storing a subset of content segments from the various content items 422 onto individual client devices 126. In accordance with the present invention, any desired number of client devices 126 may be utilized. All client devices 126 need not receive content segments. However, each content segment from every content item 422 is preferably preloaded onto at least one client device 126. The content segments may be mapped to corresponding client devices 126 in any effective manner. For example, in the FIG. 4 embodiment, client device 1 (126(*a*)) receives content segments A and C from content item A 422(*a*) and content segments Q and S from content item P 422(*p*). Similarly, client device N 126(*c*) receives content segments B and D from content item A 422(*a*) and content segments R and T from content item P 422(*p*). System users may then browse a complete content catalog of available content items 422 to initiate peer-to-peer transfers for obtaining required content segments for the content items 422 of their choice.

In accordance with the foregoing segmented content preloading procedure, storage capacity (hard disk size) of the client devices 126 does not pose a serious limitation because only a relatively small content segment from every content item 422 is pre-loaded. High-definition content (with greater amounts of image data) may thus be more effectively supported. In addition, the preloaded content may now be personalized to individual user tastes because system users may flexibly select from an extensive content catalogue of contents items, instead of just a few content items that were preloaded in their entirety. With regard to content security issues, the preloaded content segments can not be used to assemble complete content items 422 because initially there are many content segments that are missing from any given client device 126.

In addition, a complete set of content segments from the content items 422 is preloaded in a distributed manner to the various client devices 126. There is therefore no need for downloading content from content providers, and thus no expensive download fees. Furthermore, as new content items become available, corresponding new content segments may be preloaded onto new client devices 126 for subsequent dissemination to other client devices 126 through peer-to-peer network 134. Additional details regarding the functionality and utilization of segmented content preloading procedures are further discussed below in conjunction with FIGS. 7-8.

Figure 5:
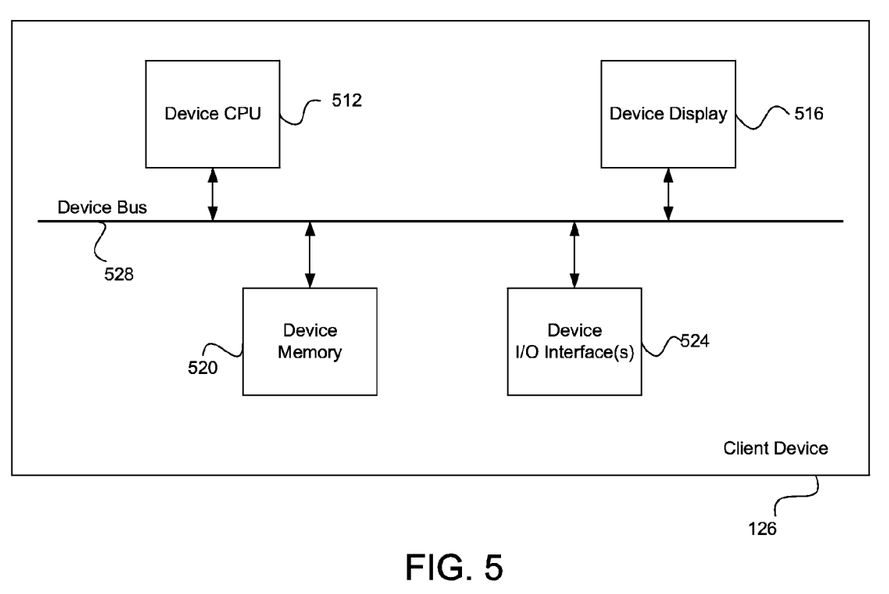
FIG. 5 is a block diagram for one embodiment of a client device from FIG. 1A, in accordance with the present invention.

Referring now to FIG. 5, a block diagram for one embodiment of a FIG. 1A client device 126 is shown, in accordance with the present invention. In the FIG. 5 embodiment, client device 126 may include, but is not limited to, a device central processing unit (device CPU) 512, a device display 516, a device memory 520, and one or more device input/output interface(s) (device I/O interface(s)) 524. The foregoing components of client device 126 may be coupled to, and communicate through, a device bus 528.

In alternate embodiments, client device 126 may readily be implemented using various components and configurations in addition to, or instead of, certain of those components and configurations discussed in conjunction with the FIG. 5 embodiment. Furthermore, in the FIG. 5 embodiment, client device 126 may be implemented as any type of appropriate electronic device. For example, in certain embodiments, client device 126 may be implemented as any type of stationary or portable electronic device, such as a personal computer, a television, a consumer-electronics device, a cellular telephone, a settop box, an audio-visual entertainment device, or a personal digital assistant (PDA).

In the FIG. 5 embodiment, device CPU 512 may be implemented to include any appropriate and compatible microprocessor device that preferably executes software instructions to thereby control and manage the operation of client devices 126. The FIG. 5 device display 516 may include any effective type of display technology including a cathode-ray-tube monitor or a liquid-crystal display device with an appropriate screen for displaying various information to a device user. In the FIG. 5 embodiment, device memory 520 may be implemented to include any combination of desired storage devices, including, but not limited to, read-only memory (ROM), random-access memory (RAM), and various types of non-volatile memory, such as floppy disks, memory sticks, compact disks, or hard disks. The contents and functionality of device memory 520 are further discussed below in conjunction with FIG. 6.

In the FIG. 5 embodiment, device I/O interface(s) 524 may include one or more input and/or output interfaces to receive and/or transmit any required types of information by client device 126. Device I/O interface(s) 524 may include one or more means for allowing a device user to communicate with other entities in electronic network 110 (FIG. 1A). For example, the foregoing means may include a keyboard device, a wireless remote-control device, a speech-recognition module with corresponding microphone, a graphical user interface with touch-screen capability, a hand-held device controller unit, or a selection button array mounted externally on client device 126. The implementation and utilization of client device 126 are further discussed below in conjunction with FIGS. 6-8.

Figure 6:
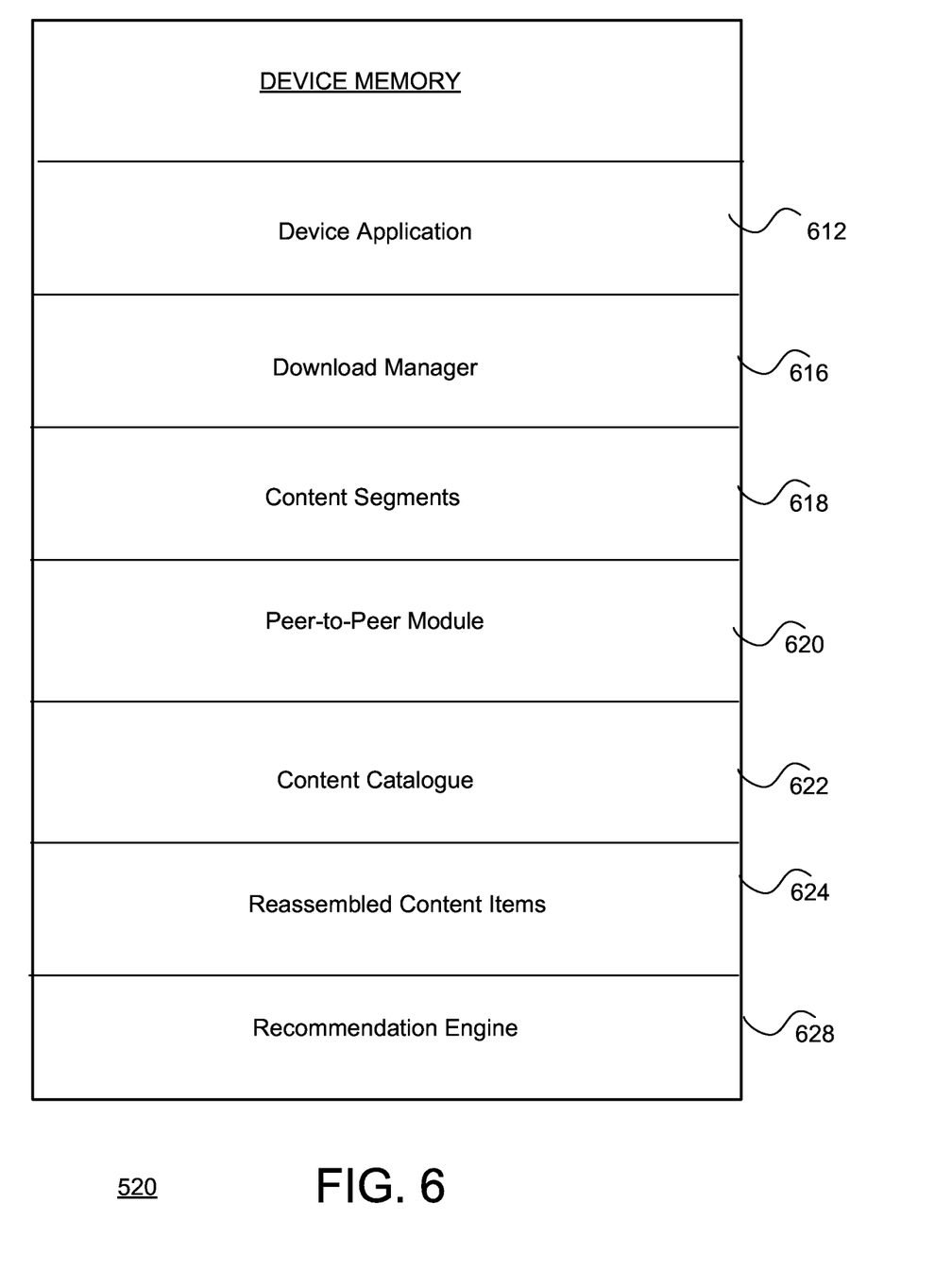
FIG. 6 is a block diagram for one embodiment of the device memory of FIG. 5, in accordance with the present invention.

Referring now to FIG. 6, a block diagram for one embodiment of the FIG. 5 device memory 520 is shown, in accordance with the present invention. In the FIG. 6 embodiment, device memory 520 includes, but is not limited to, a device application 612, a download manager 616, content segments 618, a peer-to-peer module 620, a content catalogue 622, reassembled content items 624, and a recommendation engine 628. In alternate embodiments, device memory 520 may include various other components and functionalities in addition to, or instead of, certain of those components and functionalities discussed in conjunction with the FIG. 6 embodiment.

In the FIG. 6 embodiment, device application 612 may include program instructions that are preferably executed by a device CPU 512 (FIG. 5) to perform various functions and operations for a client device 126. The particular nature and functionality of device application 612 typically varies depending upon factors such as the specific type and particular functionality of the corresponding client device 126.

In the FIG. 6 embodiment, download manager 616 may perform communication procedures for exchanging electronic information with external entities by utilizing any appropriate techniques. For example, download manager 616 may coordinate content segment transfer procedures to automatically request, receive and locally store content segments 618 from other client devices 126 in peer-to-peer network 134. In addition, download manager 616 may bi-directionally communicate with tracking server 118 to obtain current location information for specific required content segments 618. Download manager 616 may also perform a content reassembly procedure to reassemble a set of content segments into a complete content item 422 (FIG. 4).

In the FIG. 6 embodiment, content segments 618 may include either content segments that were initially preloaded onto a client device 126 during manufacture, or content segments that were subsequently received from other client devices 126. In the FIG. 6 embodiment, peer-to-peer module 620 may be utilized by a particular client device 126 to directly communicate with any other client device 126 in peer-to-peer network 134 (FIG. 2). For example, peer-to-peer module 620 may perform a content segment transfer procedure to obtain preloaded content segments from other client devices 126 in peer-to-peer network 134.

In the FIG. 6 embodiment, content catalogue 622 may include an extensive listing of all content items 422 that are supported by client devices 126 through segmented content preloading procedures. Reassembled content items 624 may include complete content items that have been reassembled from individual content segments by performing content reassembly procedures with download manager 616 or other appropriate entities. In the FIG. 6 embodiment, recommendation engine 628 may analyze various types of content recommendation criteria (such as user content-selection histories) received from tracking server 118 or other appropriate entities for automatically initiating content segment download procedures to obtain required content segments from appropriate client devices 126 to thereby automatically provide recommended content items to system users. The utilization and implementation of client device 126 is further discussed below in conjunction with FIGS. 7-8.

Figure 7:
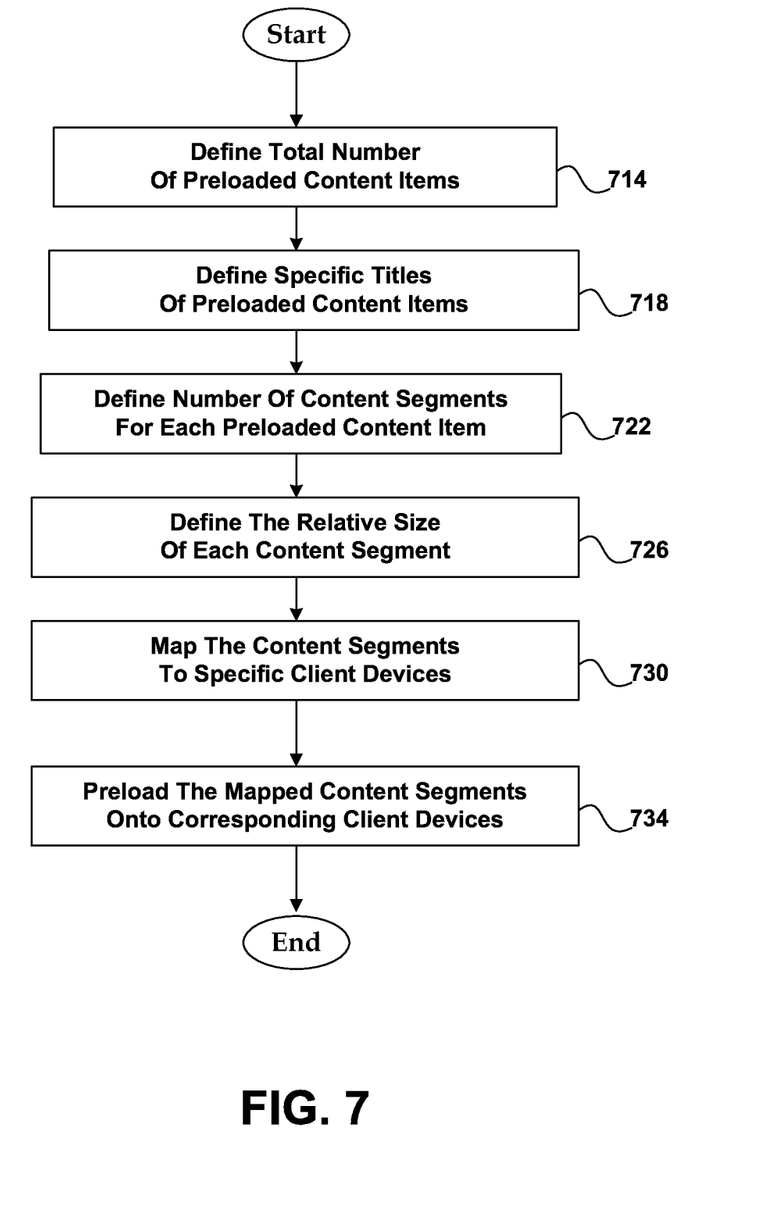
FIG. 7 is a flowchart of method steps for performing a segmented content preloading procedure, in accordance with one embodiment of the present invention.

Referring now to FIG. 7, a flowchart of method steps for effectively performing a segmented content preloading procedure is shown, in accordance with one embodiment of the present invention. The FIG. 7 flowchart is presented for purposes of illustration, and in alternate embodiments, the present invention may utilize steps and sequences other than those steps and sequences discussed in conjunction with the FIG. 7 embodiment.

In the FIG. 7 embodiment, in step 714, a system designer or other appropriate entity initially defines a total number of content items 422 (FIG. 4) for preloading onto respective client devices 126. Then, in step 718, the system designer selects the specific titles of the content items 422 for preloading onto the client devices 126. In step 722, the system designer defines the number of content segments into which each content item 422 should be subdivided. In the FIG. 7 embodiment, each content item 422 need not be subdivided into the same number of content segments.

In step 726, the system designer defines the relative size of each content segment. In the FIG. 7 embodiment, each content segment may have a different content size. However, the sum of all content segments preferably results in the entire content item. In step 730, the system designer maps the content segments to a subset of the client devices 126. In the FIG. 7 embodiment, one-to-many mapping is allowed to provide a single content segment to multiple client devices 126. In addition, it is not mandatory that all client devices be preloaded with content segments. However, each content segment is preferably mapped to at least one client device 126.

In step 734, the system designer, device manufacturer, or other appropriate entity may then preload the mapped content segments onto the appropriate corresponding client devices 126. The FIG. 7 segmented content preloading procedure may then terminate. For at least the foregoing reasons, the present invention therefore provides an improved system and method for effectively providing content to client devices in an electronic network.

Figure 8:
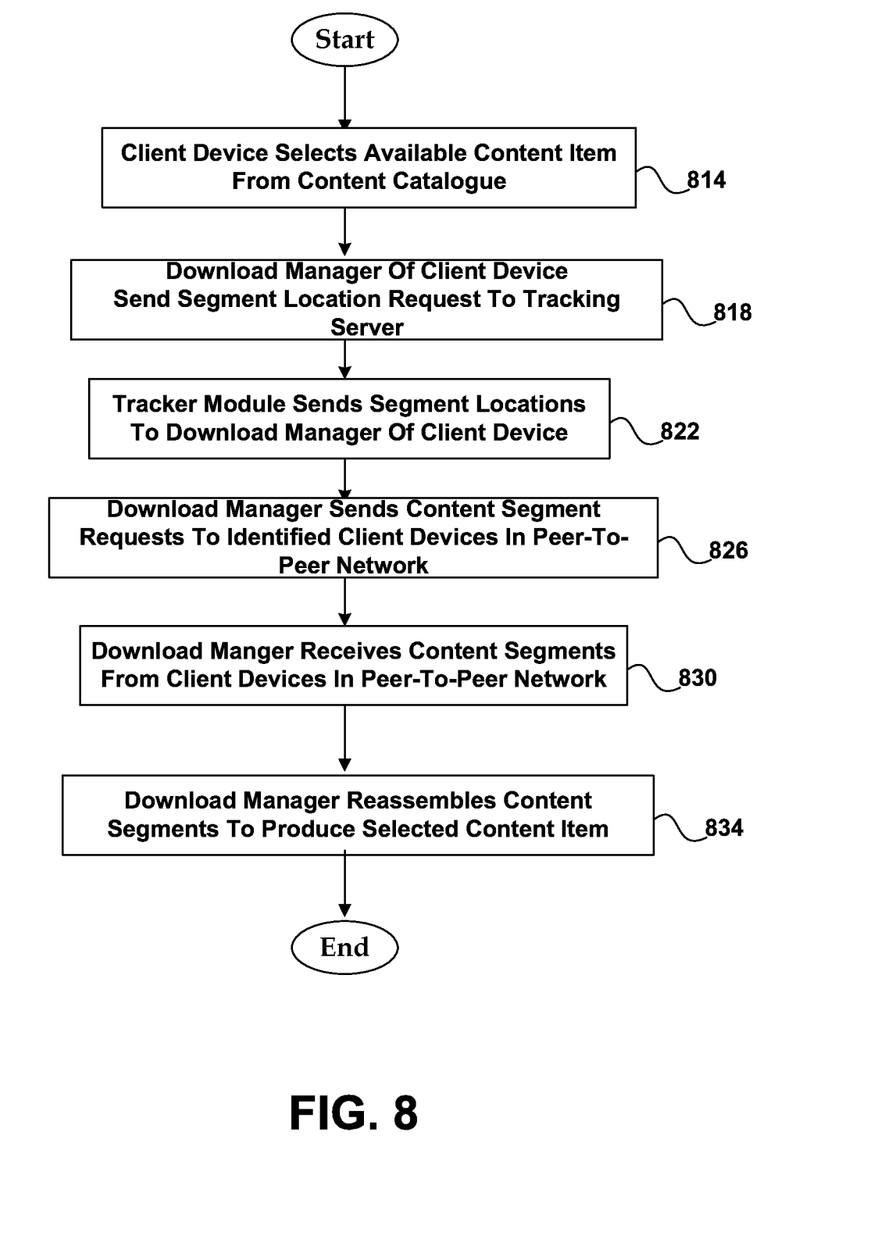
FIG. 8 is a flowchart of method steps for performing a content reassembly procedure, in accordance with one embodiment of the present invention.

Referring now to FIG. 8, a flowchart of method steps for effectively performing a content reassembly procedure is shown, in accordance with one embodiment of the present invention. The FIG. 8 flowchart is presented for purposes of illustration, and in alternate embodiments, the present invention may utilize steps and sequences other than those steps and sequences discussed in conjunction with the FIG. 8 embodiment.

In the FIG. 8 embodiment, in step 814, an electronic device 126 selects an available content item 422 from a content catalogue 622 (FIG. 6). In step 818, a download manager 616 of the electronic device 126 responsively sends a segment location request to a tracking server 118 by utilizing any effective techniques. For example, in certain embodiments, electronic device 126 accesses the tracking server 118 through the Internet or other distributed computer network. In step 822, a tracker module 822 of tracking server 118 sends appropriate segment locations 320 to the download manager 616 of the client device 126 to specifically identify current locations of content segments for the selected content item 422.

In step 826, the download manager 616 of the electronic device 126 sends content segment requests to the target client devices 126 that were identified by tracking server 118 as currently storing the missing required content segments for reassembling the selected content item 422. In step 830, the download manager of the requesting electronic device 126 receives the required missing content segments from the target client devices 126 in peer-to-peer network 134. Finally, in step 834, the download manager 834 may reassemble the received content segments to produce the entire selected content item 422 for utilization by a system user. For at least the foregoing reasons, the present invention therefore provides an improved system and method for effectively providing content to client devices in an electronic network.

The invention has been explained above with reference to certain embodiments. Other embodiments will be apparent to those skilled in the art in light of this disclosure. For example, the present invention may readily be implemented using certain configurations and techniques other than those described in the specific embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. An electronic device for reproducing a content item, comprising:
   a download manager that receives a content selection from a system user for reproducing said content item, said download manager responsively generating content segment requests to target devices in a peer-to-peer network, said target devices being preloaded in a distributed manner with content segments from said content item, said electronic device then downloading said content segments from said target devices, said download manager utilizing said content segments to reassemble said content item; and
   a processor for controlling said download manager.

2. The electronic device of claim 1 wherein said download manager obtains current storage locations of said required content segments from a tracking server, said current storage locations specifically identifying said target devices to said download manager.

3. The electronic device of claim 1 wherein said target devices and said electronic device are implemented as personal computer devices.

4. The electronic device of claim 1 wherein said content items include electronically-encoded high-resolution motion picture programs.

5. The electronic device of claim 1 wherein said target devices and said electronic device are configured in a peer-to-peer network that supports direct bi-directional communications between any of said electronic device and said target devices.

6. The electronic device of claim 1 wherein said content items include entertainment programming, movies, video data, audio data, digital photographs, still image data, graphics, web pages, program guide information, and software programs.

7. The electronic device of claim 1 wherein a segmented content preloading procedure is performed to provide said preloaded content segments to said target devices.

8. The electronic device of claim 7 wherein said segmented content preloading procedure is initiated by defining a set of content items.

9. The electronic device of claim 7 wherein said segmented content preloading procedure includes defining a total number of said content items for preloading onto said target devices.

10. The electronic device of claim 7 wherein said segmented content preloading procedure includes selecting specific titles of said content items for preloading onto said target devices.

11. The electronic device of claim 7 wherein said segmented content preloading procedure includes defining a total number of said preloaded content segments into which each of said content items are subdivided.

12. The electronic device of claim 7 wherein said segmented content preloading procedure includes defining, for each of said content items, relative sizes of respective ones of said preloaded content segments.

13. The electronic device of claim 7 wherein said segmented content preloading procedure includes creating a mapping scheme for associating said preloaded content segments with corresponding subsets of said target devices.

14. The electronic device of claim 13 wherein said segmented content preloading procedure includes preloading said preloaded content segments onto the said corresponding subsets of said target devices according to said mapping scheme.

15. The electronic device of claim 1 wherein a content reassembly procedure is performed by said download manager to recreate said selected content item from said required content segments.

16. The electronic device of claim 15 wherein said electronic device identifies said selected content item from an extensive content catalogue of said content items.

17. The electronic device of claim 15 wherein said download manager sends a segment location request to a tracking server through an Internet network, a tracker module of said tracking server returning segment locations to said download manager to specifically identify current locations of said required content segments.

18. The electronic device of claim 15 wherein said download manager sends said content segment requests to said target devices that were identified by a tracking server as currently storing said required content segments for reassembling said selected content item.

19. The electronic device of claim 18 wherein said download manager receives said required content segments from said target devices through a peer-to-peer network, said download manager reassembling said content segments to produce said selected content item.

20. The electronic device of claim 1 wherein a recommendation engine of said electronic device analyzes content recommendation criteria received from a tracking server for automatically identifying said selected content item and initiating a content segment download procedure to obtain said required content segments from said target devices.

* * * * *